United States Patent [19]
Verhoog et al.

[11] Patent Number: 5,518,840
[45] Date of Patent: May 21, 1996

[54] ELECTRODE PLATE FOR AN ELECTROCHEMICAL CELL AND HAVING A METAL FOAM TYPE SUPPORT, AND A METHOD OF OBTAINING SUCH AN ELECTRODE

[75] Inventors: Roelof Verhoog; Claude Precigout; Donald Stewart, all of Bordeaux, France

[73] Assignee: Saft, Romainville, France

[21] Appl. No.: 267,235

[22] Filed: Jun. 29, 1994

[30] Foreign Application Priority Data

Dec. 17, 1993 [FR] France .................................. 93 15254

[51] Int. Cl.$^6$ .................................................. H01M 4/04
[52] U.S. Cl. ............................................ 429/211; 429/235
[58] Field of Search ................................... 429/211, 235; 29/2

[56] References Cited

U.S. PATENT DOCUMENTS

| | | |
|---|---|---|
| 2,544,112 | 3/1951 | Schneider . |
| 3,314,821 | 4/1967 | Lambert et al. .................. 429/211 |
| 3,702,019 | 11/1972 | Pollack ............................. 29/2 |
| 5,077,153 | 12/1991 | Grange-Cossou et al. ......... 429/211 |
| 5,348,823 | 9/1994 | Caillon et al. .................... 429/246 |

FOREIGN PATENT DOCUMENTS

| | | |
|---|---|---|
| 0418774A1 | 3/1991 | European Pat. Off. . |
| 56-159066 | 12/1981 | Japan . |
| 2200068A | 7/1988 | United Kingdom . |

OTHER PUBLICATIONS

*Patent Abstracts of Japan*, vol. 8, No. 107 (E–245) (1544) 19 May 1984 & JP-A-59 023 471 (Shinkoube Denki K.K.) 6 Feb. 1984.
*Patent Abstracts of Japan*, vol. 11, No. 359 (E–559) (2806) 21 Nov. 1987, & JP-A-62 133 670 (Matsushita Electric Ind Co. Ltd) 16 Jun. 1987.

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

The electrode plate includes an active portion that is pasted with active material, and a plate head that is made up of three layers of compressed metal foam comprising: a non-pasted portion of height G of the support of the electrode plate; and two strips of non-pasted metal foam of height R on either side of the non-pasted portion of height G of the support and also extending for an overlap height $h_2$ over the pasted portion of the support. The plate head includes a zone of reduced thickness including a portion that is maximally compressed, and a transitional portion between said maximally compressed portion and the remainder of the electrode which is of thickness $e_2$. A portion of said plate head forms a connection tab. The method of obtaining the electrode consists in simultaneously rolling all three layers of metal foam in the plate head, and then in cutting matter away from the plates so as to obtain respective connection tabs.

2 Claims, 3 Drawing Sheets

FIG. 3     FIG. 4     FIG. 5
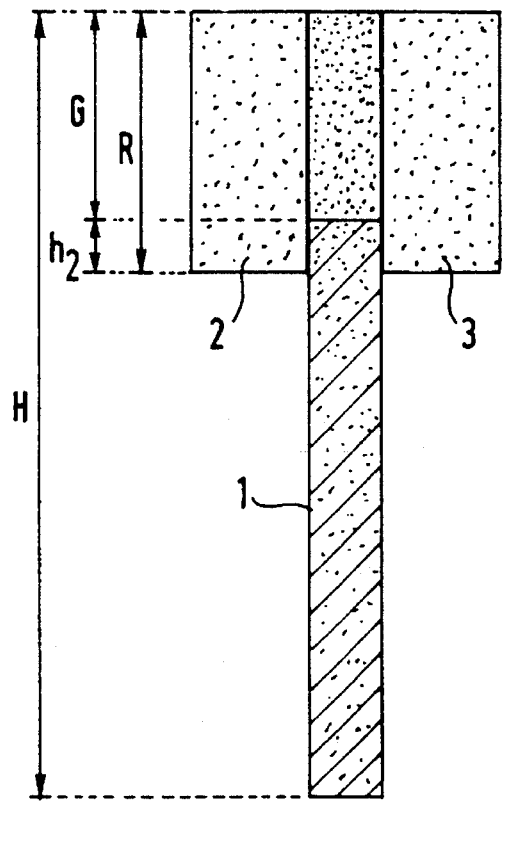
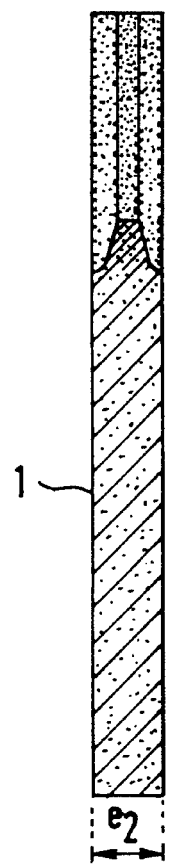
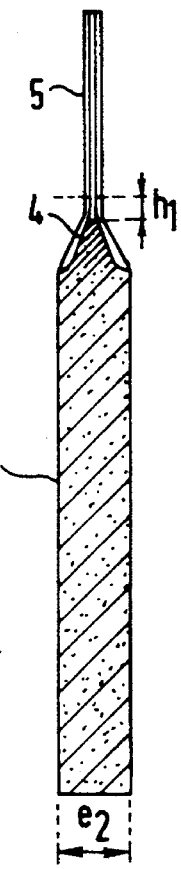
FIG. 6
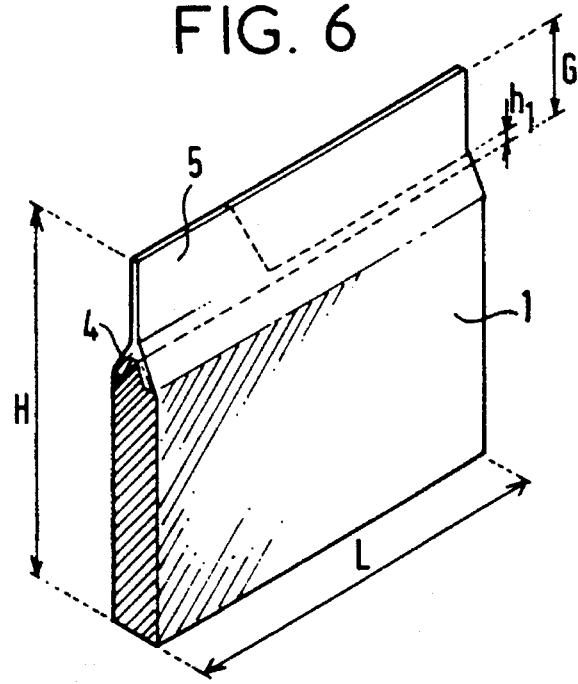

ELECTRODE PLATE FOR AN ELECTROCHEMICAL CELL AND HAVING A METAL FOAM TYPE SUPPORT, AND A METHOD OF OBTAINING SUCH AN ELECTRODE

The present invention relates to an electrode plate for an electrochemical cell and having a metal foam type support, and to a method of obtaining such an electrode.

BACKGROUND OF THE INVENTION

The invention relates in particular to electrochemical cells having an alkaline electrolyte and in which at least one of the electrodes includes a porous support or metal, e.g. nickel, filled with active material, e.g. based on nickel hydroxide.

Such a porous support has a matrix structure comparable to that of a sponge whose cells are connected to one another in a three-dimensional array that is referred to by the term "foam".

Prior to being filled with active material, the porosity of the foam is greater than 90%. In its initial state, the thickness $e_1$ of the foam used generally lies in the range 0.5 mm to 5 mm, depending on circumstances.

An electrode plate of the above type is connected to a terminal of a cell via an electrode head which includes a connection zone that forms a kind of tab. Each connection tab is subsequently connected to the cell terminal by various means, such as screws, welding, etc. . . . .

Problems arise in the making of the electrode head with its connection tab. It is necessary for that region to be of sufficient mechanical strength, for it to provide good electrical conduction so as to take up all of the current generated over the entire surface area of the electrode, for it to avoid making the plate too heavy, and for it to be as simple and as cheap as possible to make.

Various solutions have been proposed for making said connection zone. For example, proposals have been made to rivet or staple a metal part to the foam of the support, other proposals have been made to compress the foam of the support as filled with active material, so as to provide a narrow tongue of same-kind foam that is unfilled, with the tongue extending along the entire height of the support and projecting upwards so as to form a connection tab.

The first solution is expensive and heavy, while the second is fragile and does not give full satisfaction with respect to quality of electrical conduction in the electrode head and in the projecting tab.

OBJECTS AND SUMMARY OF THE INVENTION

An object of the present invention is to provide a solution that provides good mechanical strength and good electrical conduction to the plate head and to its connection tab, while ensuring that it is relatively simple and cheap to make.

The invention thus provides an electrode plate for an electrochemical cell and having a metal foam type support, the plate comprising a plate head and an active portion proper that is pasted with an active material, wherein said plate head includes a zone of thickness that is reduced relative to the thickness $e_2$ of said active portion proper, and extending along the entire length L of the plate along its top edge, said zone of reduced thickness having a small height $h_1$ over a fraction of the length of the electrode plate and a greater height G over the remainder of the length of the electrode so as to form a connection tab, said zone of reduced thickness being made up of three thicknesses of non-pasted metal foam tightly compressed against one another: the first thickness being constituted by a non-pasted zone of the support and the other two thicknesses being constituted by add-on pieces of metal foam on either side of the non-pasted zone of the support and having a small overlap height $h_2$ over the pasted portion of the support, the zone corresponding to said overlap height $h_2$ having the same non-reduced thickness $e_2$ as the remainder of the electrode plate.

The invention also provides a method of implementing electrode plates as defined above, wherein the following operations are performed starting from a support tape of a metal foam of height H and of initial thickness $e_1$:

a) active material is pasted on said support tape over a height H-G so as to conserve a non-pasted strip of height G at the top of the tape;

b) said support tape is rolled and compressed so as to reduce its thickness to a value $e_2$ that lies in the range about half to about two-thirds of $e_1$, for proper electrochemical operation of the electrode;

c) a metal foam strip of height $R=G+h_2$ is placed on either side of the strip of height G of said support tape, and also over a small overlap height $h_2$ overlying the pasted portion of said support tape;

d) the assembly comprising the two add-on tapes with the support tape between them is compressed by simultaneous rolling so as to reduce said assembly to the thickness $e_2$;

e) the zone of height G is maximally compressed, e.g. by rolling, said compression including a small transitional zone between total crushing and the thickness $e_2$ of the portion of height H-G and f) the tape is cut up so as to form electrode plates of length L, and a fraction of the top portion of each electrode plate is cut off so as to leave a height of only $h_1$ above the pasted portion of the electrode over a fraction of the length of the electrode so that the remaining non-cut off portion forms a connection tab of height G above the pasted portion.

BRIEF DESCRIPTION OF THE DRAWINGS

An implementation of the invention is described below with reference to the accompanying drawings, in which:

FIGS. 1 to 6 show various steps in the method of obtaining electrodes of the invention.

MORE DETAILED DESCRIPTION

Figure 1:
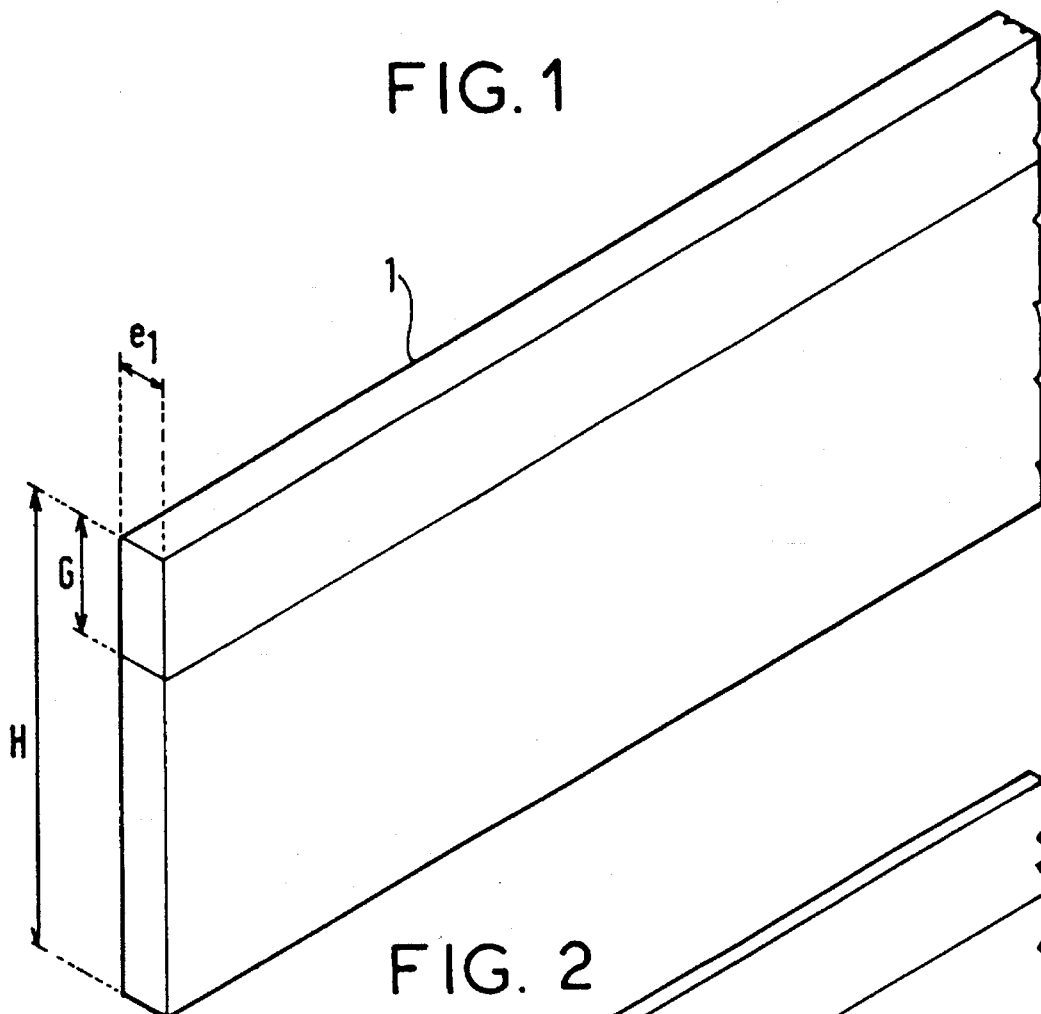

With reference to FIG. 1, there can be seen a tape 1 of nickel foam having 95% porosity. This tape has a height H and an initial thickness $e_1$ of 1.8 mm, for example.

The tape is pasted with active material, e.g. based on nickel hydroxide, with the exception of a strip of height G at the top of the tape.

Figure 2:
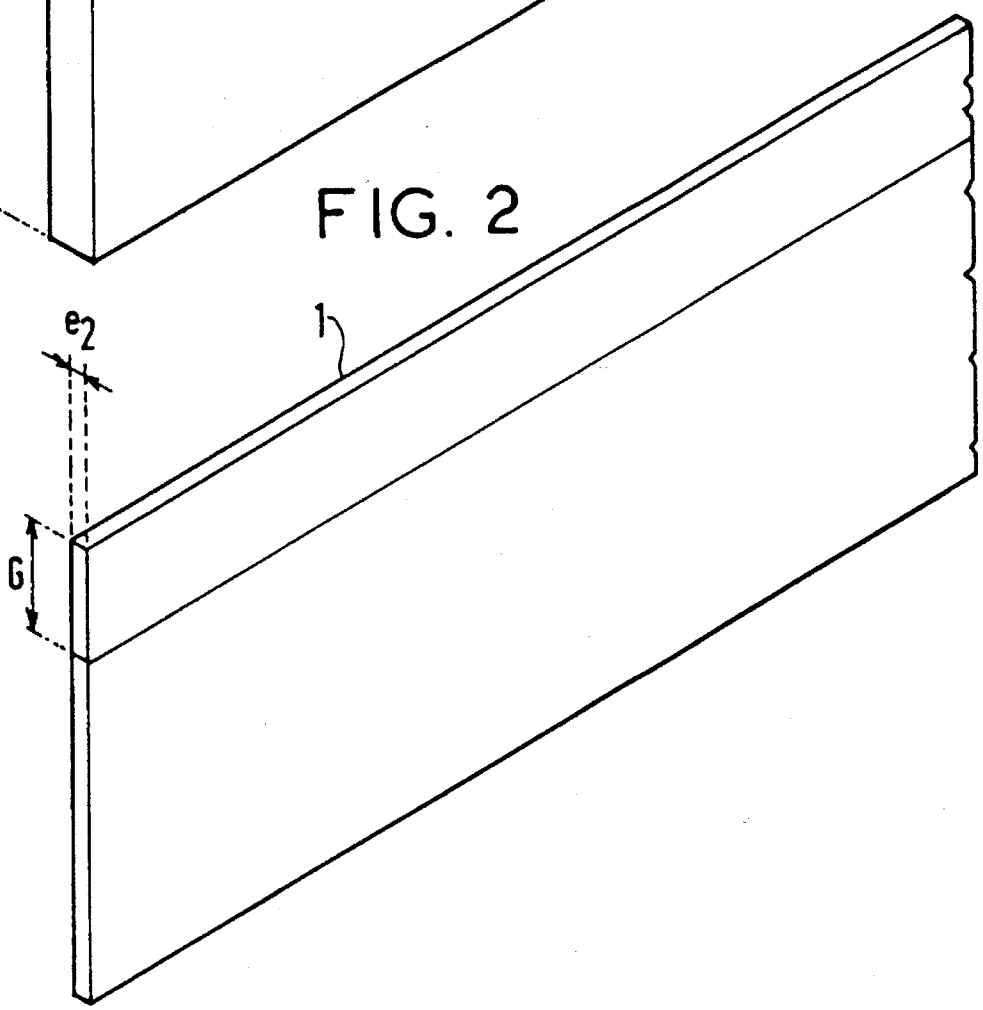

Thereafter the tape is rolled so that its thickness is reduced to a value $e_2$ selected to ensure proper electrochemical operation of the electrodes. Starting from an initial thickness of 1.8 mm, the thickness $e_2$ is about 1 mm (FIG. 2).

Thereafter (FIG. 3) respective strips 2 and 3 of nickel foam having the same porosity and the same thickness $e_1$ as the initial support 1, and of height $R=G+h_2$ are placed on either side of the non-pasted strip G Of the support 1, where the portion $h_2$ of the height of said strips 2 and 3 overlies the pasted portion of the support 1. This height $h_2$ is about 2 mm.

Thereafter (FIG. 4) said assembly is rolled as a whole so as to cause the entire assembly to have the thickness $e_2$. Thus, over the height R of the tape thus rolled down to a thickness $e_2$, the density or weight per unit area of the nickel foam is equal to three times the density or weight per unit area over the remaining height H-R of the tape.

Thereafter, maximal compression is performed, e.g. by rolling, in the zone of height G. This produces a strip that is completely crushed (FIG. 5) having porosity that is as close as possible to 0% and having a thickness of about 0.2 mm. This zone includes a transitional portion 4 of increasing thickness that runs into the remainder of the strip of thickness $e_2$.

Finally, it remains only to cut the strip up into electrode plates of length L (FIG. 6), and to cut portions off therefrom as shown by dashed lines in FIG. 6 so as to leave a connection tab 5 of height G at one end only of the plate, while leaving a height $h_1$ of about 2 mm overlying the pasted zone over the remainder of the length of the plate.

Figure 7:
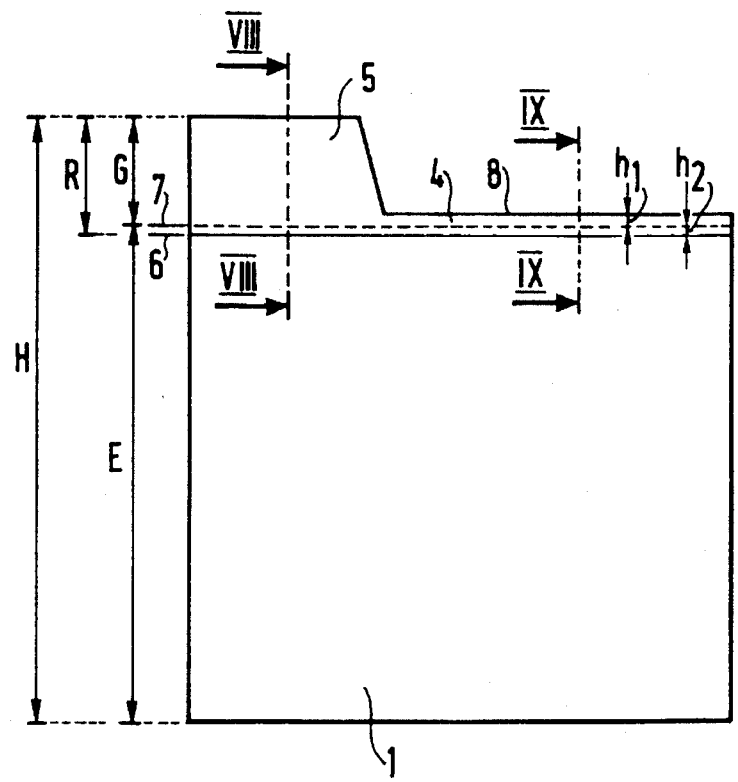
FIGS. 7, 8, and 9 are respectively an elevation, and sections on VIII—VIII and IX—IX of FIG. 7, showing an electrode plate of the invention.
Figure 8:
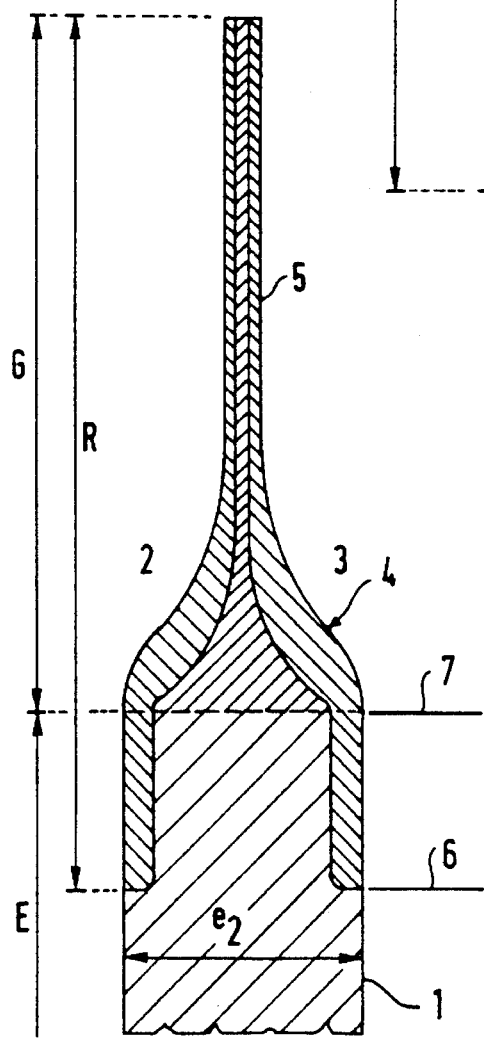
Figure 9:
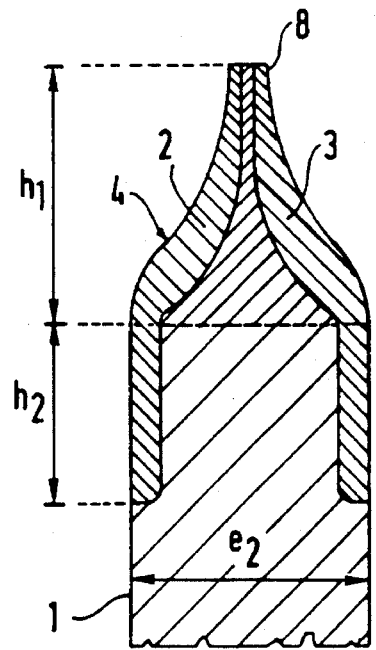

FIGS. 7, 8, and 9 show an electrode plate of the invention as obtained by the method described above.

FIG. 7 is an elevation view, FIG. 8 is a section on VIII—VIII of FIG. 7, and FIG. 9 is a section on IX—IX of FIG. 7.

These figures show that the completed electrode made of nickel foam that has been pasted with active material over a height H–G=E has a thickness $e_2$~1 mm, and includes a plate head that extends from the top end of a connection tab 5 down to a line that is referenced 6 in the figures. This plate head has nickel foam density that is three times the density of the nickel foam in the remainder of the electrode, thereby imparting good mechanical strength to the plate head and also good electrical conductivity. The plate head includes a zone of smaller thickness than the thickness $e_2$ of the remainder of the plate, that lies above a line referenced 7 in the figures which corresponds to the top edge of the pasting of the support plate 1. This portion of smaller thickness is of very small height $h_1$ (approximately 2 mm) on one side of the electrode and of considerably greater height G where it forms the connection tab along the remainder of the length of the electrode. The portion of reduced thickness includes a transitional zone 4 and a fully crushed zone 5 at the tab end and a fully crushed zone 8 elsewhere. The fully crushed portion is of porosity that is as close as possible to 0% and its thickness is about 0.2 mm.

The plate head also extends over a height $h_2$ beneath the top limit 7 of pasting in the plate 1. Over this height $h_2$, the plate head has the same thickness $e_2$ as the remainder of the plate.

The plate head comprises three layers that are compressed to a greater or lesser extent depending on the level taken into consideration, said layers all comprising nickel foam that originally had the same thickness and the same porosity: it comprises two side bands 2 and 3 and the support plate 1.

The side bands 2 and 3 are raw, i.e. they are not pasted, and the same applies to the portion of height G of the support 1.

Naturally, the dimensions given have been given purely by way of example. Similarly, the lateral strips 2 and 3 need not be constituted by a foam that is identical to that of the support 1. In practice, it is advantageous for the density or weight per unit area of the plate head to be 2.5 to 4 times the density or weight per unit area of the support 1.

An electrode as described above serves simultaneously to provide a plate head with good conduction, good mechanical strength, and a good connection tab 5, said head being simple and cheap to make and also ensuring that the connection tab lies in the center of the thickness of the plate, thereby making it possible to avoid short circuits with the adjacent plates of opposite polarity.

We claim:

1. An electrode plate for an electrochemical cell and having a metal foam support, the plate comprising a plate head and an active portion pasted with active material, wherein said plate head includes a zone of thickness that is reduced relative to the thickness $e_2$ of said active portion and extending along the entire length L of the plate along its top edge, said zone of reduced thickness having a height $h_1$ over a fraction of the length of the electrode plate and a greater height G over the remainder of the length of the electrode so as to form a connection tab, said zone of reduced thickness comprising three thicknesses of non-pasted metal foam compressed against each other: the first thickness comprising a non-pasted zone of the support and the other two thicknesses comprising add-on pieces of metal foam on either side of the non-pasted zone of the support, said add-on pieces having a height $h_2$ overlapping the pasted portion of the support, the zone corresponding to said height $h_2$ having the same non-reduced thickness $e_2$ as the remainder of the electrode plate.

2. A method of manufacturing an electrode plate comprising a zone of reduced thickness $e_2$ extending along the entire length L of the plate, said zone comprising three thicknesses of non-pasted metal foam, wherein the following operations are performed starting from a support tape of a metal foam of height H and of initial thickness $e_1$:

a) pasting active material on a portion of said support tape so as to leave a non-pasted strip of height G at the top of the tape;

b) compressing said support tape so as to reduce its thickness to a value $e_2$ that is about one-half to about two-thirds of $e_1$;

c) placing a metal foam strip of height $R=G+h_2$ on both sides of the strip of height G of said support tape, and also over a small overlap height $h_2$ overlying the pasted portion of said support tape;

d) compressing an assembly comprising the two add-on tapes with the support tape between them so as to reduce said assembly to the thickness $e_2$;

e) maximally compressing the zone of height G, thereby forming a transitional zone having a thickness which varies between a thickness of total crushing and the thickness $e_2$ of the portion of height H–G; and f) cutting the tape so as to form electrode plates of length L, and cutting off a fraction of the top portion of each electrode plate so as to leave a height of $h_1$ above the pasted portion of the electrode over a fraction of the length of the electrode so that the remaining non-cut off portion forms a connection tab of height G above the pasted portion.

* * * * *